United States Patent
Schaeffer

(10) Patent No.: US 10,781,842 B2
(45) Date of Patent: *Sep. 22, 2020

(54) EXPANSION ANCHOR

(71) Applicant: Hilti Aktiengesellschaft, Schaan (LI)

(72) Inventor: Marc Schaeffer, Altendorf (CH)

(73) Assignee: Hilti Aktiengesellschaft, Schaan (LI)

( * ) Notice: Subject to any disclaimer, the term of this patent is extended or adjusted under 35 U.S.C. 154(b) by 481 days.

This patent is subject to a terminal disclaimer.

(21) Appl. No.: 15/678,652

(22) Filed: Aug. 16, 2017

(65) Prior Publication Data

US 2017/0343026 A1    Nov. 30, 2017

Related U.S. Application Data

(63) Continuation of application No. 15/022,173, filed as application No. PCT/EP2014/068586 on Sep. 2, 2014, now Pat. No. 9,765,804.

(30) Foreign Application Priority Data

Sep. 16, 2013    (EP) ..................... 13184592

(51) Int. Cl.
*F16B 13/06*    (2006.01)
(52) U.S. Cl.
CPC .......... *F16B 13/065* (2013.01); *F16B 13/066* (2013.01); *F16B 13/06* (2013.01)
(58) Field of Classification Search
CPC ........ F16B 13/04; F16B 13/06; F16B 13/063; F16B 13/065; F16B 13/066; F16B 13/0858; F16B 13/124; F16B 39/225
USPC ... 411/44–45, 51, 57.1, 60.1, 60.3, 63, 80.5, 411/82.2
See application file for complete search history.

(56) References Cited

U.S. PATENT DOCUMENTS

| | | |
|---|---|---|
| 2,955,504 A | 10/1960 | Lovrinch et al. |
| 3,202,034 A | 8/1965 | Korenchan |
| 3,528,253 A | 9/1970 | Kovacs |
| 4,020,735 A | 5/1977 | Herback |
| 4,482,277 A | 11/1984 | Schiefer |
| 4,797,044 A | 1/1989 | Velasco |

(Continued)

FOREIGN PATENT DOCUMENTS

JP        62-111043 A    5/1987
WO    WO 2012/139511 A1    10/2012

OTHER PUBLICATIONS

Japanese Notice of Reasons for Refusal issued in Japanese counterpart application No. 2016-541880 dated Feb. 14, 2018 (Four (4) pages).

*Primary Examiner* — Roberta S Delisle

(74) *Attorney, Agent, or Firm* — Crowell & Moring LLP

(57) ABSTRACT

An expansion anchor is disclosed. The expansion anchor has a bolt having a neck region and an expansion region adjoining the neck region in which the bolt tapers down towards the neck region. The bolt has a groove in the neck region which extends along the bolt, and is at least partially surrounded by an expansion sleeve, and which has on its inside a web. The web at least partially engages in the groove in the neck region and the wall thickness of the expansion sleeve is increased locally by the web. The expansion sleeve is displaceable under radial expansion of the expansion sleeve along the bolt from the neck region into the expansion region. The web, on displacement of the expansion sleeve from the neck region, at least by region, passes into the expansion area and is forced radially outward by the expansion region.

20 Claims, 2 Drawing Sheets

(56) References Cited

U.S. PATENT DOCUMENTS

| | | |
|---|---|---|
| 4,883,395 A | 11/1989 | Dinko |
| 4,893,973 A | 1/1990 | Herb |
| 5,078,547 A | 1/1992 | Calandra et al. |
| 5,176,481 A | 1/1993 | Schiefer |
| 5,211,512 A | 5/1993 | Frischmann et al. |
| 5,352,066 A | 10/1994 | Schaeffer et al. |
| 5,685,678 A | 11/1997 | Giannuzzi et al. |
| 8,434,980 B2 | 5/2013 | Hsu |
| 8,628,286 B2 | 1/2014 | Duvekot et al. |
| 8,974,162 B2 | 3/2015 | Shimahara et al. |

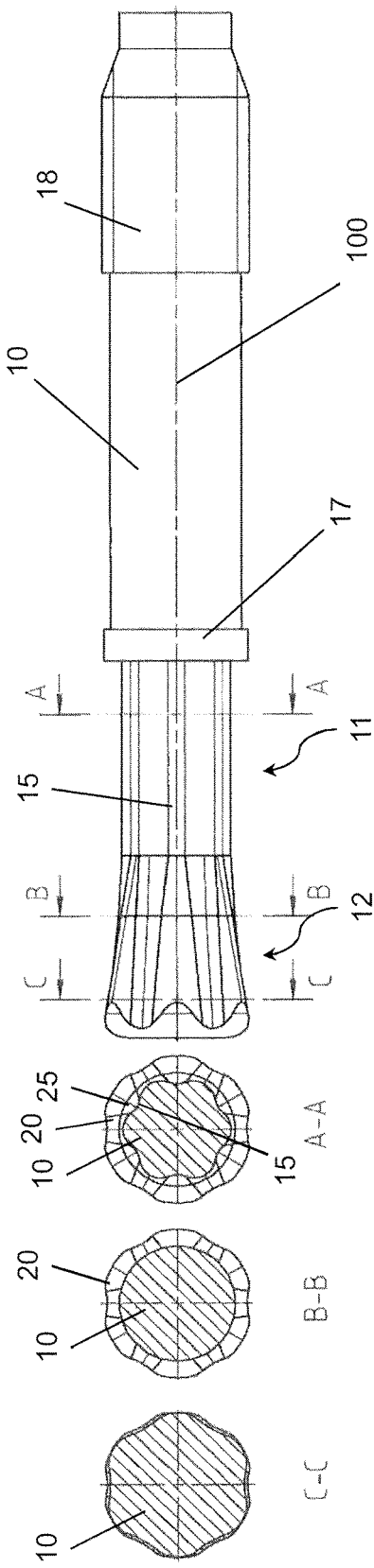
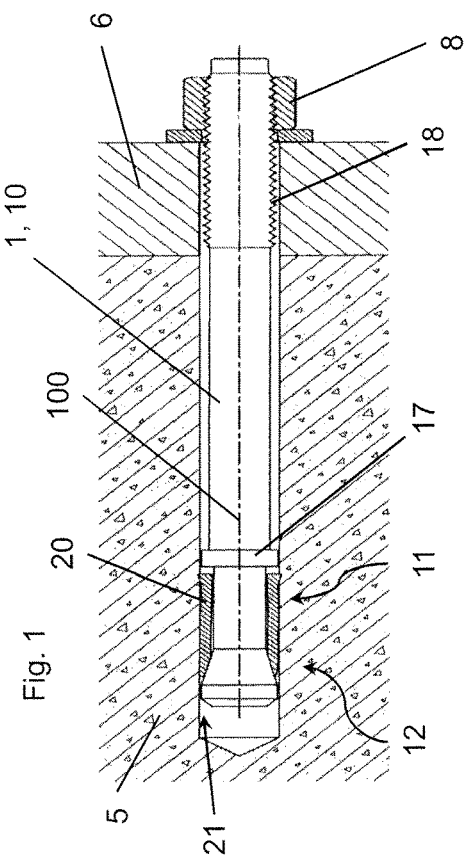

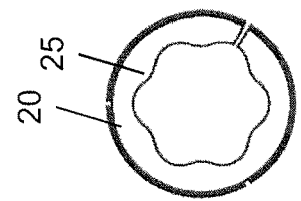
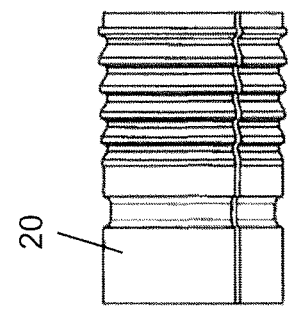
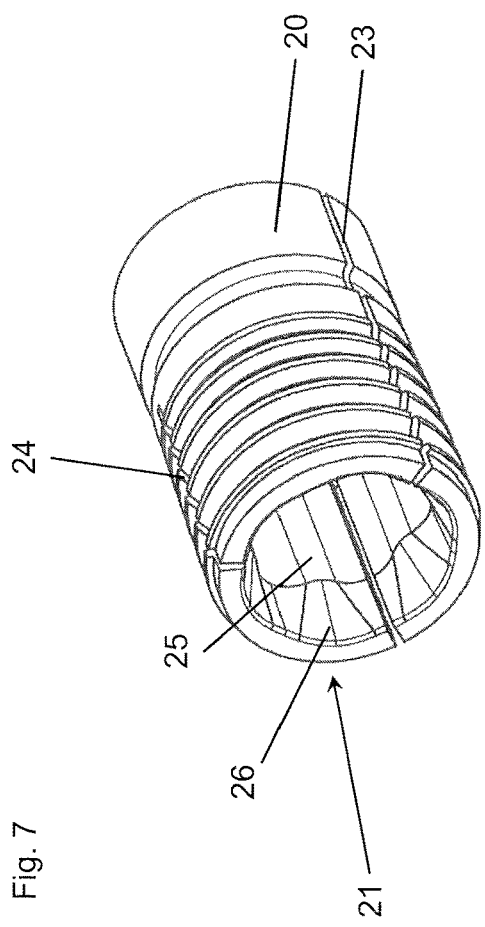
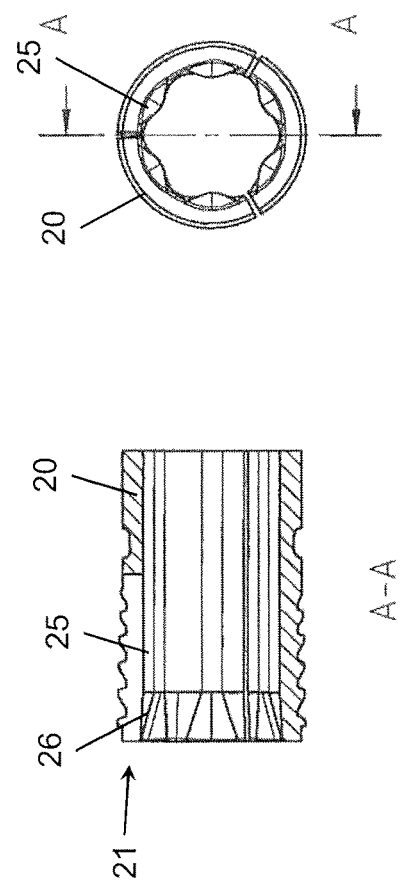

EXPANSION ANCHOR

This application is a continuation of U.S. application Ser. No. 15/022,173, filed Mar. 15, 2016, which was the National Stage of International Application No. PCT/EP2014/068586, filed Sep. 2, 2014, which claims the priority of European Patent Document No. 13184592.7, filed Sep. 16, 2013, the disclosures of which are expressly incorporated by reference herein.

BACKGROUND AND SUMMARY OF THE INVENTION

The invention relates to an expansion anchor. The expansion anchor is equipped with a bolt having a neck region and an expansion region adjoining the neck region in which the bolt tapers down towards the neck region, wherein the bolt has a groove in the neck region which extends along the bolt, and is at least partially surrounded by an expansion sleeve, and which has on its inside a web, wherein the web at least partially engages in the groove in the neck region, and wherein the wall thickness of the expansion sleeve is increased locally by the web, wherein the expansion sleeve is displaceable under radial expansion of the expansion sleeve along the bolt from the neck region into the expansion region.

Expansion anchors are known for example from DE 101 08 844 A1. They are used in a drilled hole in a substrate, for example, in a wall or ceiling of a component. By retraction of the expansion area of the bolt into the expansion sleeve, this is radially expanded and the expansion anchor is anchored into the underlying material. Typically, the bolt of such an expansion anchor has a substantially circular cross-section.

From EP 2 309 138 A2 an expansion anchor is known, wherein the expansion region has edges extending parallel to the longitudinal axis. EP 0 515 916 A2 and DE 22 56 822 A1 describe an expansion anchor, by which rotation of the expansion sleeve is prevented through a groove guide.

The object of the invention is to provide an expansion anchor which achieves particularly good load values at a low manufacturing cost and high reliability.

An expansion anchor according to the invention is characterized in that the web, on displacement of the expansion sleeve from the neck region, at least in the region, passes into the expansion area and is forced radially outward by the expansion region.

The starting point of the invention is a dilemma that can limit the load values in conventional expansion anchors having a bolt with a circular cross-section. Thus, on the one hand an as large as possible sleeve thickness is often desirable for a good anchoring to the drilled hole wall, since with increasing sleeve thickness, the maximum radial extent of the expansion sleeve can be increased and thus the anchoring to the drilled hole wall can be improved. On the other hand, the sleeve must also be accommodated in the non-expanded state in the neck region. If a large shell thickness is selected with a view to achieving good anchoring, as the diameter of the bolt in the neck region must be reduced accordingly to accommodate the sleeve, which may be accompanied by a corresponding reduction of the breaking load of the bolt. Thus, although it would be advantageous to increase the sleeve thickness for an improvement of the separation values, this is often not possible for anchors from the prior art, without having to weaken the bolt so that the load of the complete system cannot be arbitrarily increased by increasing the sleeve thickness.

This is where the invention comes into play and proposes to establish on the sleeve at least one web projecting into the sleeve interior and forming a local wall thickness increase, and also proposes a corresponding groove in the neck region of the bolt, which at least partially accommodates the web in the non-expanded state. In contrast to the anchors of EP 0 515 916 A2 and DE 22 56 822 A1, in which the webs only serve to prevent rotation, according to the invention, the web is arranged so that in the intended use of the anchor it runs on an inclined surface in the expansion region and is forced radially outward. Since the wall thickness at the web according to the invention is increased locally, in this case a particularly large maximum radial extension of the expansion sleeve and thus a particularly good anchorage can be achieved. At the same time, however, according to the invention, the bolt is not significantly weakened in its neck region, since the wall thickness increase, according to the invention, is limited to the web, so that a narrow groove in the neck region is sufficient for accommodation of the wall thickness increase. In contrast to the aforementioned prior art, a particularly wide expansion can thus be attained without substantially weakening the bolt. Thus particularly good load values can be achieved according to the invention. The apparent dilemma described above can be resolved.

In the neck region, the bolt preferably has an at least partially constant cross-section in the longitudinal direction. In the expansion region, the bolt widens to its tip, i.e., with increasing distance from the neck region. This may in particular include that the circumscribed circle diameter of the cross section of the bolt, the inscribed circle of the cross section of the bolt and/or its cross-sectional area become larger with increasing distance from the neck area. The groove and/or the web is preferably run parallel to the longitudinal axis of the bolt and/or of the expansion anchor. To the extent that we are discussing the radial direction and the longitudinal direction here, this should in particular relate to the longitudinal axis of the bolt and/or anchor, which may especially be the symmetrical and/or central axis of the bolt or the anchor. A local wall thickness increase can preferably be understood to mean that the wall thickness of the web is greater than in its surroundings.

The expansion sleeve and the bolt are preferably made of a metal material. Preferably, the bolt has an external thread for a nut at its end region opposite the expansion region. In particular, a stop, for example an annular shoulder, may be formed on the bolt, limiting the displacement of the sleeve from the expansion range. The expansion sleeve, which can also be designed in several parts, can also extend to the external thread of the bolt. The expansion range is provided according to the invention for expanding the expansion sleeve, i.e. for radially expanding the expansion sleeve.

The web engaging in the groove on the bolt can also form a rotation lock which inhibits rotation of the expansion sleeve relative to the bolt about the longitudinal axis of the bolt. In principle, the web can have interruptions. Preferably, however, the web is continuous.

Thus, so that the web is reliably activated, i.e., pressed in a load-bearing way to the surrounding drilled hole wall, the web should, as a rule, reach as far as possible to the front face of the expansion sleeve, i.e., to the front side, which faces the expansion region. It is particularly preferred, therefore, that the distance of the web from the end face of the expansion sleeve, which faces the expansion zone, is less than 10 times, 5 times, 2 times, 1 times or than half of the height of the web. Alternatively or additionally, provision can be made for the same reason that the distance of the web from the end face of the expansion sleeve, which faces the expansion region is smaller than that measured in the longitudinal direction length of the shortest expansion slot of the expansion sleeve, and that the distance is preferably less than the 0.5 times, the 0.25 times or 0.1 times that length. Alternatively or additionally, for the same reason provision can be made for the web to extend into the front third or the front quarter of the expansion sleeve. The height of the web can be understood to mean, in particular, the maximum wall thickness difference of the expansion sleeve between the web and its surroundings.

A further advantageous embodiment of the invention is that the groove proposed in the neck region of the bolt extends to the expansion area of the bolt. In this configuration, the relatively stiff web need not be bent in advance, and the expansion sleeve can particularly reliably grip the surrounding drilled hole wall at the beginning of the anchor setting operation. The groove envisaged in the neck portion of the bolt may also extend into the expansion area of the bolt, which can further improve the expansion behavior, especially at the beginning of the anchor setting operation.

It is particularly expedient that the bolt has a plurality of grooves in the neck region extending longitudinally along the bolt, and that the expansion sleeve on its inside has a plurality of webs through which the wall thickness of the expansion sleeve is increased locally in each case, and each of which engages at least by region in one of the grooves in the neck area. Preferably, during displacement of the expansion sleeve from the neck portion to the expansion region, a plurality of webs, in particular all the webs, are at least locally in the expansion region forced radially outward from the expansion region. In this embodiment, a plurality of webs can act in the above manner, so that the maximum radial expansion of the sleeve can be further improved without weakening the neck region of the bolt. Suitably, the number of grooves in the neck region matches the number of webs on the sleeve.

If multiple grooves are present according to the invention, the features described in this application can be implemented with a single groove, with a plurality of these grooves or with all of these grooves. Additionally or alternatively, if a plurality of webs according to the invention are present, the features described in this application may be realized in a single web, a plurality of these webs or all of these webs.

It is particularly preferred that the bolt in the expansion region, at least by sections, have a non-circular cross-section, i.e., in particular a cross-section which deviates from a circular shape. This embodiment can take into consideration that the expansion sleeve also has a non-circular cross-section due to the web on its inner side. Through a non-circular cross-section in the expansion region, the expansion behavior of the inside non-circular expansion sleeve can be influenced and improved.

For example, it may be provided that in the expansion region the bolt has a greater slope in the extension of the groove as relative to the keyway, at least by region, in particular in the circumferential direction offset to the groove. Preferably, therefore, the expansion region in the extension of the groove of the neck region increases more steeply in the radial direction than offset to the groove, which means that opening angle when viewed from the neck region is at least greater by region in the extension of the groove than circumferentially offset to the groove. According to this embodiment, the wall thickness increase formed by the web is also particularly strongly expanded, so that a high expansion value can be obtained. Offset to the groove, the slope of the outer surface of the bolt can also be negative, which may simplify manufacturing. Where this slope is mentioned, this can in particular refer to the longitudinal axis of the bolt as the abscissa and an axis running perpendicular to the longitudinal axis through the neck area, in particular through the groove, as the ordinate, i.e., with a positive slope, the distance of the outer surface of the bolt from the longitudinal axis increases with increasing distance from the neck region, and with a negative slope, the distance of the outer surface of the bolt from the longitudinal axis decreases with increasing distance from the neck region.

Alternatively or additionally, in the expansion region, the bolt, can at least by region, have a smaller slope than offset to the groove. In this way, for example, the expansion of the relatively stiff web can be delayed, and the expansion sleeve can particularly reliably grip the surrounding drilled hole wall at the beginning of the anchor setting operation.

A further preferred embodiment of the invention is that the bolts in the neck region, especially in the area of the at least one groove and/or in the expansion region have at least one rotationally symmetrical cross-section. Rotational symmetry can in particular be understood to mean that the rotation of the bolt about a certain angle around its longitudinal axis brings the bolt back to cover itself. The expansion sleeve can also have a rotationally symmetrical cross-section, which may be deviated from at most by the optionally present expansion slot in the sleeve. In a rotationally symmetrical cross section, the tensile forces can be absorbed particularly equally by the bolt, so that a particularly high load values can be achieved with particularly low material cost.

Conveniently, the outer surface of the bolt in the expansion region always adjoins with the outer surface of the bolt in the neck area. According to this embodiment, a smooth transition between the neck region and the expansion region is present. This can improve the expansion behavior even further, particularly at the beginning of the anchor setting process.

A further advantageous embodiment of the invention is that the web has a chamfer at its end facing the expansion region. This allows, among other things the relatively stiff web to be made more flexible on the inlet side, and the expansion sleeve can particularly reliably grip the surrounding drilled hole wall at the beginning of the anchor setting operation.

Furthermore, it can be provided that the bolt, in a recess, in particular in the groove, has an adhesive coating which can be activated by the expansion sleeve, in particular by the web. For example, the provided adhesive in the recess can be microencapsulated, so that it is activated by pressure exerted by the expansion sleeve. Alternatively, on the expansion sleeve a substance can also be provided which chemically activates the adhesive. The adhesive may secure the sleeve on the bolt in the expanded state, so that a particularly robust connection can be provided. Because of the arrangement in a recess, adhesive is particularly well protected against premature activation or rubbing, so that particularly high reliability is provided. The recess with the adhesive can in principle be provided both in the neck region and in the head region. Particularly preferably, however, the recess in question is formed by the groove in the neck region, which accommodates the web. Since in this case the groove performs multiple functions, the manufacturing cost is particularly low.

Additionally or alternatively, it can be provided that the sleeve has an adhesive coating in a recess which is activated by the bolt.

The invention also relates to a manufacturing method in which an expansion anchor according to the invention is made, in which the bolt of the expansion anchor is formed from the first blank, and the expansion sleeve of the expansion anchor is formed from a second blank. The first blank may be a piece of wire, on which the expansion region is formed, for example, by swaging or rolling. The second blank may be a sheet metal plate, which is bent into the sleeve.

It is particularly preferred that the web is formed on the inside of the expansion sleeve in a rolling process. In this rolling process, other functional elements of the sleeve, such as external projections or gradations in the proximity of the end, are formed.

Preferably, the axis of rotation runs parallel to at least one shaping roller used in the rolling process, at least at an angle less than 45° to the web.

Furthermore it can be provided that a coating liquid is applied on the first blank after forming the groove, and the first blank is then rotated about its longitudinal axis, so that the coating liquid accumulates outside the groove and hardens there with locally increased layer thickness. According to this embodiment of the invention, a special bolt cross-section is used in connection with a rotary coating method to generate a targeted inhomogeneous coating, whereby an additional functionality can be obtained.

The invention also relates to an arrangement consisting of a substrate having a hole and an expansion anchor according to the invention, which is arranged in the hole, wherein the expansion of the bolt presses the expansion sleeve at its web against the wall of the hole. Accordingly, the expansion anchor is anchored in the hole, wherein the expansion sleeve is activated at the web, i.e., the expansion sleeve is pressed directly together with the hole wall at the web. The substrate may in particular be a concrete substrate.

The invention will be explained in more detail based on preferred embodiments, which are schematically illustrated in the accompanying drawings, wherein individual characteristics of the embodiments shown below in the context of the invention may in principle be realized in any combination or individually.

BRIEF DESCRIPTION OF THE DRAWINGS

FIG. 1 shows a basic schematic, partial longitudinal sectional view of an expansion anchor according to the invention, set in a concrete substrate;

FIG. 2 shows a side view of the bolt of the expansion anchor of FIG. 1;

FIG. 3 is a cross-sectional view A-A according to FIG. 2 through the bolt of the expansion anchor with the expansion sleeve of FIG. 7 in the expanded state;

FIG. 4 is a cross-sectional view B-B according to FIG. 2 through the bolt of the expansion anchor with the expansion sleeve of FIG. 7 in the expanded state;

FIG. 5 is a cross-sectional view C-C according to FIG. 2 through the bolt of the expansion anchor with the expansion sleeve of FIG. 7 in the expanded state;

FIG. 6 is a perspective view of the tip portion of the bolt of FIG. 2;

FIG. 7 is a perspective view of an expansion sleeve of the expansion anchor of FIG. 1 corresponding to the bolt from FIG. 2;

FIG. 8 is a view of the expansion sleeve of FIG. 7 from the front;

FIG. 9 is a view of the expansion sleeve of FIG. 7 from the side;

FIG. 10 is a view of the expansion sleeve of FIG. 7 from the rear; and

FIG. 11 is a longitudinal section A-A according to FIG. 8 through the expansion sleeve.

DETAILED DESCRIPTION OF THE DRAWINGS

The figures show an embodiment of an expansion anchor 1 according to the invention. As particularly shown in FIG. 1, the expansion anchor 1 has a bolt 10 and an expansion sleeve 20 which surrounds the bolt 10. The bolt 10 has a neck region 11 having a substantially constant cross-section and connected to the neck region 11 in the front end of the bolt 10, an expansion region 12 for the expansion sleeve 20, in which the bolt 10 widens from the neck area 11 to its front end. On the side of the neck region 11 opposite the expansion region 12, the bolt 10 has a stop 17 for the expansion sleeve 20 formed, for example, as an annular shoulder. At its rear end region opposite the expansion region 12, the bolt 10 is provided with an external thread 18 for a nut 8.

When setting the expansion anchor 1, the bolt 10 with expansion region 12 is advanced in the direction of the longitudinal axis 100 of the bolt 10 into a drilled hole in the substrate 5 of FIG. 1. Due to the stop 17, the expansion sleeve 20 is thereby also introduced into the hole. Then the bolt 10, for example by tightening the nut 8, is withdrawn a short distance from the drilled hole. Because of its friction with the drilled-hole wall, the expansion sleeve 20 thereby stays back and displacement of the bolt 10 relative to the expansion sleeve 20 occurs, in which the expansion region 12 of the bolt 10 penetrates deeper into the expansion sleeve 20, so that the expansion sleeve 20 is radially expanded by the expansion region 12 of the bolt 10 and pressed to the wall of the drilled hole. Through this mechanism, the expansion anchor 1 is fixed in the substrate 5. The set state of the expansion anchor 1, in which it is fixed in the substrate 5, is shown in FIG. 1, but also in FIGS. 3 to 5. By means of the nut 8, an attachment 6 can be fixed to the substrate 5.

As particularly shown in FIGS. 2, 3 and 6, the bolt 10 in its neck portion 11 has a plurality of grooves 15, in the illustrated embodiment six grooves 15. These grooves 15 extend parallel to each other and parallel to the longitudinal axis 100 of the bolt 10, preferably starting at the stop 17, to the expansion region 12. In cross-section (FIG. 3), the bolt 10 in the neck region 11 has a non-circular shape, preferably a waveform, wherein the troughs are formed by the grooves 15. The flanks of the grooves 15 extend preferably continuously in the cross-section of the bolt 10. Basically, the edges of the grooves 15 may also form a step shape.

As FIGS. 7, 8, 10 and 11 particularly show, the expansion sleeve 20 on its inside has a plurality of webs 25, in the illustrated embodiment, six webs 25. The number of webs 25 on the inside of the expansion sleeve 20 preferably corresponds to the number of grooves 15 in the neck region 11 of the bolt 10 or is smaller than the number of grooves 15. The webs 25 extend parallel to each other and parallel to the longitudinal axis 100 of the bolt. In cross section (FIGS. 3-5 and 8), the expansion sleeve 20 preferably has an inner-side waveform, wherein the wave crests are formed by the webs 25. The flanks of the webs 25 in the cross section of the expansion sleeve 20 preferably extend continuously. Basically, the flanks of the webs 25 could also form a step shape. At the webs 25, the expansion sleeve 20 has a greater wall thickness than in the circumferential direction offset to the webs 25, as can be seen for example in FIGS. 3 and 8.

As shown in particular in the cross-sectional view of FIG. 3, the webs 25 of the expansion sleeve 20 engage with the grooves 15 in the neck region 11 of the bolt 10. The webs 25 extend to the end face 21 of the expansion sleeve 20, thus to that end face which faces the expansion region 12 of the bolt 10 and is opposite the stop 17.

In the expansion region 12 of the bolt 10, the radius of the bolt 10 about the longitudinal axis 100 increases with increasing distance from the neck region 11 (see FIGS. 2 to 5). However, the opening angle of the bolt 10 in the expansion region 12 varies in the circumferential direction of the bolt 10, as can be seen in particular in FIGS. 2 and 6. In the embodiment of FIGS. 2 and 6, the slope of the bolt 10 in the expansion region 12 in the extension of the grooves 15 is greater than offset to the grooves 15. Basically, however, embodiments are conceivable in which the slope of the bolt 10 in the expansion region 12 in the extension of the grooves 15 is smaller than offset to the grooves 15.

Like the neck region 11, the expansion region 12 of the bolt 10 in cross-section (for example, FIG. 5) has a non-circular shape, preferably a waveform. However, since the expansion region 12 constantly adjoins the neck region 11, and since the slope in the extension of the grooves 15 is greater than offset therefrom, the bolt 10 in a preferred cross-sectional plane of the expansion region 12, which is shown in FIG. 4, has a circular cross-section.

In the non-expanded state of the expansion sleeve 20, which is present on insertion of the bolt 10 in the substrate 5, the local wall thickness increases of the expansion sleeve 20, which are formed by the webs 25, are at least partially received in the grooves 15 in the bolt 10, so that the wall thickness increases of the expansion sleeve 20, which are formed by the webs 25, do not or at best only partially protrude radially outwards. On expansion of the expansion sleeve 20, if the expansion sleeve 20 thus passes into the expansion region 12 and is expanded radially therefrom, the webs 25 are activated and appear on the outer side of the expansion sleeve 20, as can be seen for example in FIG. 4.

As shown in particular in FIGS. 7 and 11, the webs 25 in the region of the front end face 21 of the expansion sleeve 20 each have a chamfer 26. At this chamfer 26, the wall thickness of the expansion sleeve 20 to the front end face 21 preferably decreases continuously.

As can be seen in particular in FIG. 7, the expansion sleeve 20 has an expansion slot 24 emanating from the front end face 21 of the expansion sleeve 20. These expansion slots 23 and 24 facilitate radial expansion of the expansion sleeve 20 through the expansion region 12 of the bolt 10. The expansion sleeve 20 can be made by rolling a sheet metal blank.

As shown in FIG. 6, the bolt 10 can in at least one of the grooves 15, preferably at the transition to the expansion region 12, have an adhesive coating 19, which is activated by the corresponding web 25 of the expansion sleeve 20 during installation of the anchor, and which can fix the expansion sleeve 20 to the bolt 10.

What is claimed is:

1. An expansion anchor, comprising:
   a bolt with a neck region and an expansion region adjoining the neck region, wherein the bolt tapers to the neck region and wherein the bolt, in the neck region, has a groove extending longitudinally along the bolt; and
   an expansion sleeve at least partially surrounding the bolt, wherein the expansion sleeve has a web on an inside of the expansion sleeve, wherein the web engages at least partially in the groove in the neck region, wherein a wall thickness of the expansion sleeve is locally increased by the web, and wherein the expansion sleeve is displaceable from the neck region to the expansion region;
   wherein the web, during displacement of the expansion sleeve from the neck region to the expansion region, at least partially enters the expansion region and is forced radially outward by the expansion region.

2. The expansion anchor according to claim 1, wherein a distance of the web from an end face of the expansion sleeve, which faces the expansion region, is smaller than 2 times a height of the web.

3. The expansion anchor according to claim 1, wherein the groove extends to the expansion region of the bolt.

4. The expansion anchor according to claim 1, wherein the bolt, in the neck region, has a plurality of grooves extending along the bolt, wherein the expansion sleeve on the inside has a plurality of webs which increase the wall thickness of the expansion sleeve locally and which respectively at least partially engage in one of the plurality of grooves, and wherein the plurality of webs during displacement of the expansion sleeve from the neck region to the expansion region at least partially enter the expansion region and are forced radially outward by the expansion region.

5. The expansion anchor according to claim 1, wherein the bolt, at least in a section, has a non-circular cross-section in the expansion region.

6. The expansion anchor according to claim 1, wherein the expansion region has a greater or a smaller slope in a region aligned with the groove than in a region offset to the groove.

7. The expansion anchor according to claim 1, wherein the bolt, in the neck region and/or in the expansion region, in at least a section has a rotationally symmetrical cross-section.

8. The expansion anchor according to claim 1, wherein an outer surface of the bolt in the expansion region continuously adjoins an outer surface of the bolt in the neck region.

9. The expansion anchor according to claim 1, wherein the web, at an end face facing the expansion region, has a chamfer.

10. The expansion anchor according to claim 1, wherein the bolt has an adhesive coating in the groove which is activatable by the web of the expansion sleeve.

11. The expansion anchor according to claim 1, wherein the neck region has a constant cross-section in a longitudinal direction.

12. The expansion anchor according to claim 1, wherein the groove weakens the bolt.

13. The expansion anchor according to claim 1, wherein a distance of the web from an end face of the expansion sleeve, which faces the expansion region, is smaller than 0.5 times or 0.25 times or 0.1 times a length of a shortest expansion slot of the expansion sleeve, measured in a longitudinal direction.

14. A manufacturing method, comprising:
    making an expansion anchor according to claim 1, wherein the bolt of the expansion anchor is formed from a first blank and wherein the expansion sleeve of the expansion anchor is formed from a second blank.

15. The method according to claim 14, wherein the web is formed on the inside of the expansion sleeve in a rolling process by a shaping roller and wherein an axis of rotation of the shaping roller runs at an angle less than 45° to the web.

16. The method according to claim 14, wherein a coating liquid is applied on the first blank after forming the groove, and wherein the first blank is then rotated about its longitudinal axis such that the coating liquid accumulates outside the groove and hardens with locally increased layer thickness.

17. An apparatus, comprising:
a substrate, wherein the substrate defines a hole; and
an expansion anchor according to claim 1, wherein the expansion anchor is disposed in the hole and wherein the expansion region of the bolt presses the expansion sleeve at the web against a wall of the hole.

18. An expansion anchor, comprising:
a bolt with a neck region and an expansion region adjoining the neck region, wherein the bolt, in the neck region, has a groove extending longitudinally along the bolt; and
an expansion sleeve at least partially surrounding the bolt, wherein the expansion sleeve has a web on an inside of the expansion sleeve, wherein the web engages at least partially in the groove in the neck region, wherein a wall thickness of the expansion sleeve is locally increased by the web, and wherein the expansion sleeve is displaceable from the neck region to the expansion region.

19. The expansion anchor according to claim 18, wherein the bolt, at least in a section, has a non-circular cross-section in the expansion region.

20. The expansion anchor according to claim 18, wherein the expansion region has a greater or a smaller slope in a region aligned with the groove than in a region offset to the groove.

\* \* \* \* \*